E. N. KERN.
LIQUID FUEL DISPENSING APPARATUS.
APPLICATION FILED MAY 1, 1915.
1,177,870.
Patented Apr. 4, 1916.
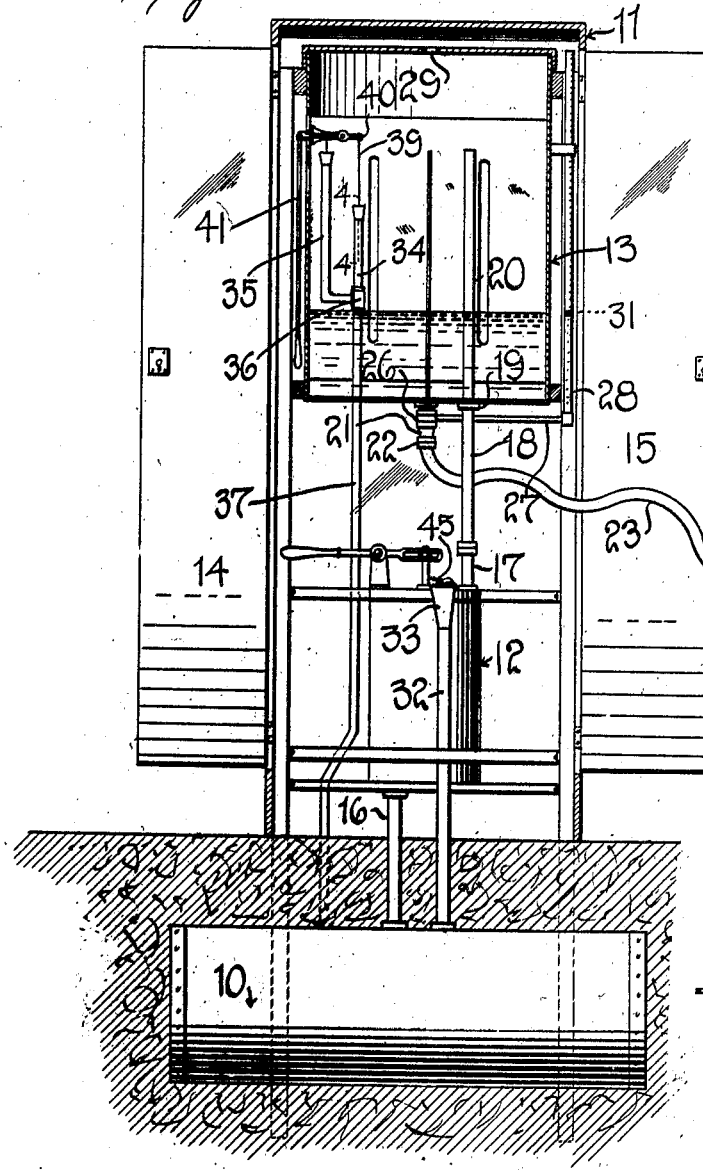
Inventor
EDWARD N. KERN
By Watson E. Coleman
Attorney

UNITED STATES PATENT OFFICE.

EDWARD N. KERN, OF PORTSMOUTH, OHIO.

LIQUID-FUEL-DISPENSING APPARATUS.

1,177,870.  Specification of Letters Patent.  Patented Apr. 4, 1916.

Application filed May 1, 1915. Serial No. 25,254.

*To all whom it may concern:*

Be it known that I, EDWARD N. KERN, a citizen of the United States, residing at Portsmouth, in the county of Scioto and State of Ohio, have invented certain new and useful Improvements in Liquid-Fuel-Dispensing Apparatus, of which the following is a specification, reference being had to the accompanying drawings.

My present invention relates broadly to new and useful improvements in liquid fuel dispensing apparatus and has more particular reference to an improved system of the type embodying a storage tank and a pump.

The primary object of the invention is to provide in a dispensing apparatus, a storage tank, a pump, whereby the gasolene, kerosene or equivalent liquid fuel may be drawn from the tank, and a measuring tank or cylinder into which the liquid is discharged by the pump and from which it is adapted to flow by gravity into the automobile gasolene tank or other container to be filled.

A more specific object of the invention is to provide a measuring tank, which is mounted a considerable distance above the pump so that a relatively strong gravity flow will always be obtained when an automobile tank or similar container is to be filled, and to accompany the measuring tank by a sight gage, whereby the purchaser may visually determine the amount of gasolene which is poured into the tank of the automobile.

Another specific object is to attach to the measuring tank, a discharge tube and nozzle which latter member may be led to the tank of an automobile for filling the same and to accompany this discharge nozzle by a relatively fixed return tube and funnel which lead back into the storage tank and through which any excess amount of gasolene pumped into the measuring tank may be returned to the storage tank.

A further object is to provide, as a connection between the measuring tank and the pump, an inlet pipe, the upper end of which extends a considerable distance into the tank so that the gasolene or other liquid will flow into the tank and become a relatively still body before it passes into the discharge tube, thereby eliminating the objectionable spurts, which ordinary dispensing pumps or machines impart to the gasolene passing out of the discharge nozzle.

The above, and other incidental objects of a similar nature, which will be hereinafter more specifically treated, are accomplished by such means as are illustrated in the accompanying drawings, described in the following specification, and then more particularly pointed out in the claims which are appended hereto and form part of this application.

With reference to the drawings, wherein there has been illustrated the preferred embodiment of this invention, as it is reduced to practice, and throughout the several views of which similar reference numerals designate corresponding parts, Figure 1 is a front elevation of the apparatus with the doors of the housing or cabinet in open position, the measuring tank being shown in vertical section; Fig. 2 is a detail view partly in section of the sight gage. Fig. 3 is a detail horizontal section taken through the partition employed in connection with the measuring tank; and Fig. 4 is a detail section on the line 4—4, of Fig. 1, showing particularly the valve employed with the overflow pipe.

As best disclosed as an operative entirety in Fig. 1 of the accompanying drawings, the dispensing apparatus of the present invention includes broadly a storage tank 10, a housing or casing 11, a pump 12, and a measuring tank 13.

The storage tank 10 is preferably embedded in the ground when the apparatus is employed in a private garage or is located in a cellar or below the ground, when the apparatus is employed by a dealer and is positioned adjacent the curb of the sidewalk. The casing or housing 11 in which the pump and measuring tank are mounted, is preferably cylindrical in shape, although it may be octagonal, rectangular or of any other design. Front and rear full length doors, indicated at 14 and 15 are provided for the housing 11, so that the pump, measuring tank, discharge nozzle and associated parts may be protected against the elements, when the apparatus is mounted out of doors and also locked against theft of the liquid or tampering with the pump.

The pump designated generally by the numeral 12, does not form any part of my present invention and has, therefore, been illustrated conventionally in the drawings. It will be understood that any type of liquid pump may be employed in connection with my invention, without departing in any way from the spirit thereof. The pump casing is, of course, connected to the supply tank by a pipe 16. The discharge pipe or nipple 17 of the pump is connected by a flexible tube or metal pipe (whichever may be desired), as indicated at 18, to the measuring tank 13. This tube or pipe 17 connects at its upper end to an inlet nipple 19 which is carried by the bottom wall of the measuring tank. Leading upwardly into the measuring tank from the nipple 19, is a filling pipe 20, the upper end of which is located in proximity to the top wall of the measuring tank so that the liquid will freely discharge into the measuring tank, without encountering resistance, even though the amount of liquid contained in the tank be at relatively high level.

Secured to the bottom wall of the measuring tank and preferably, although not necessarily, at the center thereof, is an outlet nipple or nozzle 21, to the lower end of which may be secured by a clamping ring or equivalent device 22, the flexible discharge tube 23. The outer end of this discharge tube 23 is provided with a nozzle 24, having a stop cock or equivalent valve 25. The nipple 21 is provided, intermediate its length with a globular enlargement 26 which defines a substantially spherical internal chamber from which leads a feed pipe 27, whereby the liquid discharged into the measuring tank is allowed to pass into the gage tube 28. This feed pipe for the gage tube is provided with a relatively small bore.

The gage pipe is, of course, formed from glass or equivalent transparent material which may, or may not, as desired, be mounted in a metallic protecting tube. Brackets of any suitable character may be employed in attaching this gage tube to the outside of the measuring tank. Air vents, indicated at 29 and 30 are formed in the top wall of the measuring tank and in the upper end of the gage tube for the obvious purpose of opening the tank and tube to atmospheric pressure, whereby the columns of liquid in the tubes and tank will stand at equal levels. In this connection, it will, of course, be apparent that when the tank is filled, some of the liquid will pass through the feed tube 27 into the gage tube and that the liquid will stand at the same height in the tube, as in the tank. An indicating disk 31 of cork or equivalent material may be placed within the gage tube, so that the height at which the gasolene or other liquid stands may be readily determined. The gage glass is, of course, accompanied by indicia, representing the number of gallons of liquid contained within the measuring tank when the liquid stands at varying heights in the gage tube.

From the foregoing description, it will now be observed that the pump may be operated to discharge any desired quantity of gasolene within the measuring tank and that the operator of the pump may visually determine, by means of the gage glass, the exact amount of liquid pumped into the measuring tank. It will also be apparent that by comparing the readings on the gage tube, prior to the opening of the discharge nozzle, for the filling of the automobile tank and the reading after this nozzle has been closed, the purchaser may readily determine the exact amount of gasolene which has been pumped into the tank of his automobile.

As a means for enabling the operator of the pump to return to the storage tank any gasolene which may remain in the measuring tank, after the automobile tank or other container to be filled has been charged to its capacity, I provide a return pipe 32 which leads into the storage tank and is secured at its upper terminal to the casing of the pump. A funnel 33 is provided for this return pipe so that the discharge nozzle 24 may be opened to discharge the excess liquid in the measuring tank into the return pipe.

In order that the user of the apparatus may pump into the measuring tank only the desired amount of gasolene or other liquid, I employ a pair of overflow pipes, indicated at 34 and 35, the former of which is relatively short and the latter of which is relatively long. The upper end of the member 34 is arranged at the five gallon level in the measuring tank, while the upper end of the member 35 is arranged at the ten gallon level. The two pipes 34 and 35 are connected by a coupling 36 to a drain pipe 37 which leads back into the supply tank 10. As disclosed in Fig. 4, a conical valve 38 is provided for the upper ends of each of the pipes 34 and 35. These valves are, as illustrated in Fig. 1, connected by cords or other flexible members 39 to a lever 40 which is pivoted within the measuring tank and is provided with a wire or equivalent controlling rod 41. It will now be seen that when the measuring tank is to be filled, the operator may pull down on the rod 41, thereby lifting the valve of the pipe 34, so that in case more than five gallons of oil is pumped into the tank, the excess amount will drain back into the supply tank. On the other hand, if it is desired that ten gallons be pumped into the measuring tank, the rod 41 may be pushed upwardly, thereby lifting the valve in the pipe 35 without affecting the valve of the pipe 34. Thus in case more than ten gallons of oil is pumped into the tank, the excess amount will flow back through the pipe 35 and down the pipe 37 into the supply tank.

It is now to be explained that while the two pipes 34 and 35 have been described as being at 5 and 10 gallon limits, they may, of course, be disposed at any other level. Also, if deemed advisable, a greater number of pipes, equivalent to the pipes 34 and 35 may be provided, so that the tank may be filled at a two gallon level, six gallon level or eight gallon level, etc.

In order to eliminate the tendency of the liquid pumped into the measuring tank to swirl and splash, I have provided the partition walls 42 and 43 which are fitted together to intersect and to extend at right angles to each other. On each side of the line of intersection, each of the members 42 and 43 is provided with a vertically extending slot 44. The slot establishes communication between the four compartments defined by the partition wall.

In reduction to practice, it has been found that the form of this invention illustrated in the drawings and referred to in the above description as the preferred embodiment, is the most efficient and practical; yet realizing that the conditions concurrent with the adoption of this device will necessarily vary, it is desirable to emphasize the fact that various minor changes in the details of construction, proportion and arrangement of parts may be resorted to, when required, without sacrificing any of the advantages of this invention, as defined by the appended claims.

A spring hinged closure 45 is provided for the funnel 33 to prevent the entrance of dust into the supply tank and to prevent the vaporization of the liquid contained therein.

While the apparatus is designed particularly for use in dispensing gasolene and similar liquid fuels, it may, of course, be efficiently employed in dispensing any kind of liquid.

What is claimed is:—

1. A device of the character described including a measuring tank, a plurality of supply pipes within the tank in communication with a source of supply, said pipes having their free extremities arranged at differing distances from the base of the tank, valves coacting with each of the pipes and maintained in closed adjustment by gravity, a lever pivotally supported intermediate its length, a flexible connection between each of the valves and the lever, said flexible connections being engaged with the lever at opposite sides of its pivot point.

2. A device of the character described including a measuring tank, an inlet tube discharging into the tank near its top, an overflow pipe extending within the tank and terminating a predetermined distance above the base thereof, a controlling valve coacting with the pipe, and a slotted partition arranged within the tank.

3. A device of the character described including a measuring tank, an inlet tube discharging into the tank near its top, an overflow pipe extending within the tank and terminating a predetermined distance above the base thereof, a controlling valve coacting with the pipe, and means intersecting the measuring tank for rendering quiescent the liquid therein.

In testimony whereof I hereunto affix my signature in the presence of two witnesses.

EDWARD N. KERN.

Witnesses:
 BESSIE KILCOYNE,
 ROSE KILCOYNE.